United States Patent [19]

Montes

[11] Patent Number: 5,013,147
[45] Date of Patent: May 7, 1991

[54] SYSTEM FOR PRODUCING STATIONARY OR MOVING THREE-DIMENSIONAL IMAGES BY PROJECTION

[76] Inventor: Juan D. Montes, Urbanizacion Las Cabanas II, Chalet No. 9, Las Rozas, Madrid, Spain

[21] Appl. No.: 498,093

[22] Filed: Mar. 21, 1990

Related U.S. Application Data

[63] Continuation-in-part of Ser. No. 247,368, Sep. 21, 1988, which is a continuation-in-part of Ser. No. 138,665, Dec. 28, 1987.

[30] Foreign Application Priority Data

Dec. 29, 1986 [ES] Spain ................................. 8603612

[51] Int. Cl.$^5$ .............................................. G03B 35/00
[52] U.S. Cl. ........................................ 352/58; 352/69; 352/81; 352/43; 350/128
[58] Field of Search .................... 352/58, 81, 69, 43, 352/57; 355/22; 350/128

[56] References Cited

U.S. PATENT DOCUMENTS

| | | | |
|---|---|---|---|
| 1,883,290 | 10/1932 | Ives | 350/128 |
| 1,918,705 | 7/1933 | Ives | 352/58 |
| 3,482,913 | 12/1969 | Glenn | 352/58 |
| 4,078,854 | 3/1978 | Yano | 350/128 |

Primary Examiner—Monroe H. Hayes
Attorney, Agent, or Firm—Ladas & Parry

[57] ABSTRACT

Device for reproducing stationary or three-dimensional images by projection, the photographing being effected through several objectives, each located at a different position in space; in the reproduction system, the different images, if not reproduced on a diffusion surface, do not need to be distinguished by their position on it; the projection is effected directly onto a transparent optical system, the images being distinguished from each other by their angle of projection; this optical system is formed of a sheet of vertical cylindrical lenses, the transverse size of which is not conditioned by the number of images and the aperture of which is independent of the orthoscopic viewing angle, and of a sheet of horizontal cylindrical lenses of short focal length and arbitrarily small size constituting a reproduction system which is easy to manufacture and can be adapted to any viewing angle, giving a different image at each point of viewing.

7 Claims, 4 Drawing Sheets

SYSTEM FOR PRODUCING STATIONARY OR MOVING THREE-DIMENSIONAL IMAGES BY PROJECTION

This is a continuation-in-part of copending application Ser. No. 247,368 filed on Sept. 21, 1988 which is a continuation-in-part of Ser. No. 138,665 filed on Dec. 28, 1987.

FIELD OF THE INVENTION

The present invention describes a device capable of reproducing stationary or moving three-dimensional images by projection, using ordinary light.

BACKGROUND OF THE INVENTION

The systems of taking and reproducing images with depth developed up to now can be divided into two major groups, namely the most modern ones, developed since 1947, based on the formation of images due to the interference of beams of coherent light, which are called holographic systems, and the oldest, which do not record by interference of waves, which are known as non-holographic systems.

Among the latter, stereoscopic and three-dimensional systems are distinguished from each other. The term stereoscopic is used for systems in which two distinct images, one for each eye, are used in the reproduction. The term three-dimensional is used to distinguish systems which use a greater number of taken and reproduced images, allowing observation within a wide viewing angle, without inconveniencing the observers by placing optical filters or any other contrivance before them.

The technique of holography is based on photography by reconstruction of wavefronts. These systems require coherence of the light sources for image-taking and reproduction. Both the objects which are to be recorded as well as the images which are to be reproduced need to be illuminated with coherent light only. This has hindered the commercializing of systems using this process which are capable of making photographs of distant objects which, like the moon, cannot be lit up with a coherent beam. It is found impossible to photograph sunsets or reflections of the sun or moon on the sea, landscapes etc. Finally, as observation through transparency is necessary, the size of the reproduced image is limited.

In the stereoscopic systems, the photograph is taken through two objectives which are separated from one another by a distance approximately equal to the average value of the distance between human eyes.

For this stereoscopic photography, special systems of lenses have been developed which are suitable for attachment to conventional cameras, such as the Fazekas camera, which is described in U.S. Pat. No. 4,525,045.

There are stereoscopic systems in which the bringing of a different image to each eye is obtained by processes which are not suitable for projection. They include those which place an optical system, such as the Brewster prisms and Wheatstone flat mirrors, between the observers and reproduced image [Norling, J. A., The Stereoscopic Art . . . A. Reprint. J. Smpt 60, No. 3, 286-308 (March 1953)], or the Kempf concave mirror [U.S. Pat. No. 4,623,223].

The stereoscopic systems suitable for projection differ greatly depending on the process used to bring the image taken up by the left lens to the left eye and that taken up by the right lens to the right eye. The best known and most widely used in stereoscopic projections with movement are those which employ colored, polarized filters or shuttering.

The main limitation of the stereoscopic systems used in projection is that they necessarily inconvenience the observer by placing optical filters or a shuttering mechanism in front of him.

Among the three-dimensional systems of reproduction using ordinary light which have been developed up to the present, there are some which are capable of showing the reproduced image on the right or left side when the observer moves to the left or right or vice versa.

Most of these three-dimensional reproduction devices employ a diffusion surface on which the various images are printed, projected, generated, amplified or simply transmitted. Typical printing systems are ones which use the photographic material itself as a diffusion surface with projection onto an opaque or translucent surface in cinematography or projected television; typical generation systems are those in which the diffusion surface is the cathode ray tube itself; and typical transmission systems are those which employ light conductors or amplifiers.

It is important to emphasize one essential characteristic common to any diffusion surface which greatly affects the design of all devices for three-dimensional reproduction which use this type of surface.

This essential characteristic is that: "Any point of the diffusion surface is converted into a center transmitting light photons in all directions."

As a consequence, any observer, whatever his position, will see the whole image reproduced on the diffusion surface.

If two or more images are reproduced at the same time on the same point of the diffusion surface, the photons coming from the different images appear mixed together, whatever their direction.

For this reason, distinguishing the different images reproduced on the diffusion surface is achieved by reserving a different place for each of them, that is by means of "*scalar image differentiation*".

All systems which contain a diffusion screen succeed, by different methods, in reserving a different portion on it for each image. This position is usually a vertical band of very small width.

In the systems for the reproduction of stationary photographic images it is on the photographic material itself, which acts as diffusion surface, that the images appear divided into fine vertical stripes. The element entrusted with dividing the images into fine stripes is normally a sheet of cylindrical lenses.

Among the systems which use this technique mention may be made of the following:

U.S. Pat. No. 1,918,705 to Ives which describes a process for obtaining three-dimensional images on photographic material.

Glenn's U.S. Pat. No. 3,482,913 which describes a method and the apparatus needed to compose three-dimensional photographs.

Wah-Lo's U.S. Pat. No. 4,086,585 which describes a system and a camera for controlling the field depth in three-dimensional photography.

In the systems for the reproduction of moving images by projection, the diffusion surface consists of an opaque material if the projection is a front projection or of a translucent material if the projection is a rear projection. In all cases, the images appear on this surface divided into fine vertical stripes.

Among the systems which employ this technique mention may be made of:

U.S. Pat. No. 1,883,290 to Ives which describes a method of front projection on an opaque screen in which the element which divides the image into fine vertical stripes is the same sheet of vertical cylindrical lenses through which observation is effected and another method of rear projection onto a translucent surface in which the element which divides the images into fine vertical stripes is also a sheet of vertical cylinders used in the method of copying different films onto a single one. In the first case, it will be necessary to eliminate the brightness generated by the mirror image of the projectors on the cylinder sheet and in the second an adjustment of high precision is required in order to position the image stripes on each cylinder.

U.S. Pat. No. 4,078,854 to Yano describes two methods of three-dimensional reproduction by rear projection. In the first, corresponding to FIGS. 1, 2, 3 and 4 of the patent, the diffusion screen, which is made of translucent material, appears between two sheets of vertical cylindrical lenses. One of these sheets of cylindrical lenses has the task of dividing the image into fine vertical stripes on the diffusion surface. The second method of this patent, which replaces the diffusion surface by a sheet of horizontal cylindrical lenses will be discussed further below.

U.S. Pat. No. 4,737,840 to Morishita describes a method which is based on rear projection through a vertical opaque grid located in front of the diffusion surface. In the diffusion surface each image always appears at a different place, in a different vertical stripe.

Other processes of reproducing moving images exist in which the diffusion surface is formed by the ends of light conductors, as described in U.S. Pat. No. 4,571,616 to Haisma, in which each image also appears within a different vertical stripe. In this case, the images are positioned after being guided through light conductors.

In all these cases, the viewing is effected through an optical screen of vertical cylindrical lenses the focal lines of which are contained in a plane in which the diffusion surface is situated.

Below there is first given a critical examination of the three-dimensional horizontal parallax reproduction systems described above.

The factors to be taken into account in the comparison of the different systems are:

The orthoscopic viewing angle, the quality of the image reproduced, and the cost resulting from the complexity of manufacture.

The maximum viewing angle is limited by the aperture of the vertical cylinder, the ratio between the width thereof and its focal length; if this angle is exceeded, observation takes place on an image line corresponding to the adjacent cylinder, producing the undesirable pseudoscopic effect, that is to say, inverted depth.

Haisma, in his aforementioned patent, (see page 1-65) points out the importance of this problem.

If the set of stripes corresponding to each cylinder occupies the width of the latter, the maximum viewing angle without pseudoscopy is expressed by:

$$2 \arctan = \frac{\text{wide cylinder}}{2 \times \text{focal length}}$$

which, for ordinary materials, the indices of refraction of which vary around 1.5, has an approximate value of 54°, which is clearly insufficient in many cases.

The preservation of this angle on the width of the entire screen requires precise correspondence between each cylinder and its image (group of stripes). This correspondence is difficult to achieve when the lenticular sheet charged with generating the image divided into fine vertical stripes is not the same as that used in the observation of the image. This lack of correspondence is a problem to be taken into account in the photographic reproduction systems and in those other rear projection systems in which, such as that used by Ives 290, the division of the image into fine vertical stripes is effected in a process different from that of projection. This difficulty is foreseen by Ives 290 himself although he does not propose any method of solving it (see page 3, 103-106).

Since the orthoscopic viewing angle is a function of the ratio between the width of the image and its focal length, in order to increase this angle two procedures may be employed: either increase the width of the image corresponding to each cylinder or decrease the focal length of the cylinder with respect to its width, using materials of very high indices of refraction (close to 2).

Both methods are mentioned in Ives 290.

The first, increase in the size of the image reproduced, can be noted on page 3. In this method, a loss of quality upon reproduction results, due to the fact that the distance between the axes of the cylinders is greater than the diameter thereof, dark vertical lines therefore appearing between cylinders; see Ives 290, page 3, 65-75. The enormous complexity of manufacture of this lenticular sheet is obvious.

The second, based on the relative decrease of the focal length by increase of the index of refraction, leads to the need of placing opaque sheets between cylinders, substantially complicating manufacture (see Ives 290, page 4, 45-50).

In both cases, the complex section of these cylinders recommends front projection and, as a result, an undesirable brightness appears on the lenticular sheet caused by the specular vision of the projectors. This new difficulty makes it necessary to project onto a suitably inclined vertical sheet facing the projectors and observers (see Ives 290, page 4, 60-65).

The quality of the image is limited by the transverse dimension of the cylindrical lens, which, in its turn, is limited by that of the vertical band of the image.

It is to be taken into account that the width of each vertical image band must be as many times less than the size of the cylinder as the number of images reproduced. For this reason, the size of the cylinder is limited by the size of the image, which, in its turn, is less than that of said cylinder.

The condition for a stripe of width "d" not being perceptible for a healthy eye is that $$d \leq \frac{\text{viewing distance in meters}}{3.500}$$

For example:
0.3 mm for a distance of 1 m, and
0.08 mm for a distance of 0.25 m.

If 10 images are used, the width of each image stripe must be 0.03 and 0.008 mm respectively. These values are on the order of only 15 times greater than the wavelength of visible light. If a number of images greater than 10 were used the situation would, logically, become worse. The difficulties in manufacture are obvious and, therefore, the price of the commercial product is high. In systems in which, like Haisma's, the image is positioned through optical conductors, this difficulty may be incapable of solution.

It is important to point out that the inventors of systems based on the scalar differentiation of images, who have tried to provide their system with a large orthoscopic viewing angle, have had to solve the problem of designing cylindrical elements with a large aperture.

This is the reason why, in these systems, the orthoscopic viewing angle coincides with the aperture angle of the vertical cylinders through which the viewing is effected.

For this reason, the systems based on the scalar differentiation of images of high value of orthoscopic viewing angle give rise to designs of vertical cylinders which are very expensive or impossible to construct.

Furthermore, a high orthoscopic viewing angle, with the need of continuity and great depth in the reproduction, requires a large number of images. As has been pointed out, a large number of images, in a scalar differentiation system, requires some cylinders also of high transverse size, since each cylinder must house as many stripes as images, and these stripes cannot be made indefinitely small. Therefore, the size of the cylinders is conditioned and the quality of the reproduction may be deficient.

These reasons explain why these systems have not been successfully marketed, not even in cinematography with small projection screens.

Secondly, within this general technique, there are included the integral reproduction systems. This is the name given to systems capable of reproducing horizontal and vertical parallax simultaneously.

The invention is that of Lippmann, the famous French optician in 1908 (Lippmann, M. G., Epreuves Rversibles Donnant la Sensation du Relief. J. Phys. 7, 4th Series, 821–825 (Nov-1908)).

The basis of integral photography is to prepare fly's eyes lens sheet, of glass or plastic, with a tremendous number of spherical plano-convex lenses (for example 10,000).

One example of integral reproduction is Ando's U.S. Pat. No. 3,852,524.

Ando, at no time, mentions the number of images taken nor the width of the band required for their transmission; he simply says that they are multiple and that a carrier of very high frequency must be used.

In fact, this process of image taking and reproduction requires the handling of an enormous amount of information, because 2-dimensional image is received behind every plano-convex lens.

In order to make the system work, the number of plano-convex lenses used, both for the reproducing and the taking of images, must be on the order of thousands.

Apart from these difficulties and the use of spherical optical screens, the reproduction is always carried out in all the forms described in his patent through a diffusion surface with all the drawbacks which this use entails.

Haisma, in his aforementioned U.S. Pat. No. 4,571,616 describes an integral relief system based on taking the image with conventional cameras forming a square mosaic. He gives as an example a number of 9 cameras arranged in 3 columns of 3 cameras each.

The reproduction is continued by positioning nine different sections of images behind each spherical lens, at the rate of one section for each image taken. The adjustment is achieved by appropriately positioning the optical conductors by mechanical means. While we have previously seen the complexity of manufacture brought about by the positioning of image stripes behind each cylinder, the problem here is much more serious, since it involves positioning $n^2$ squares of images behind each spherical microlens.

In addition, in the system described by Haisma a diffusion surface is used, in this case the ends of optical conductors.

The above-mentioned drawbacks of the horizontal parallax reproduction systems also appear here not only in the reproduction of the horizontal parallax but also in the reproduction of the vertical parallax and they have prevented the successful marketing of this system.

Certain other fields of application also exist, as in robotics, where also, as in the aforementioned Ando patent, optical screens of spherical lenses are used; see for example U.S. Pat. No. 4,410,804 to Stauffer. His purpose, however, is to obtain data on the distance of the objects and their size, and never three-dimensional reproduction with vertical and horizontal parallaxes of images.

The only system of which knowledge is had which does not employ diffusor surfaces is that described by Yano.

Yano, in the second part of his U.S. Pat. No. 4,078,854, replaces the diffusion surface by a sheet of horizontal cylindrical lenses, but does not do so in order to design a new system based on the angular differentiation of images, but rather as a mere variant of what was described in the first part and based on the scalar differentiation on a diffusion surface of translucent material.

In fact, the system is referred to in that patent as a stereoscopic reproduction system, having a very small number of images reproduced (see page 1, 10-13) which at most can be five (see page 5, 30-32) with a wide viewing margin, but, as recognized in that patent (see page 3, 32-36), there are viewers who will see the same image with both eyes and for whom it is necessary to provide a sensation of depth by other means.

For this, this last-mentioned device has two elements, a convergent optical system which conditions and makes difficult the projection of images of large size and a screen composed of two sheets of cylindrical lenses; the aperture of the cylinders has a concrete and fixed value independent of the distance between objectives-projectors and the projection distance; which makes it obvious that its design is not based on the angular differentiation of images.

Accordingly, this last-mentioned system described in the second part of Yano's Patent is a mere variant of what is described in the first part, which is based on the scalar differentiation of images and like all the others, with various drawbacks.

Finally, it should be noted that the above systems were designed in order to cause an image taken in its entirety by a single camera to reach each eye. There is concerned the achieving of three-dimensional vision by causing each eye to see an image taken by a different camera and therefore located at a different place.

This concept is described in greater or lesser length by the previous inventors; see for example, Ives 290 page 4, 10-25, Ives 705 page 1, 95-100 and page 2, 0-2

Glen page 1, 65-70, Haisma page 1, 24-29, Yano page 1, 14-19 and page 2, 29-32.

SUMMARY OF THE INVENTION

The system forming the object of this invention is based on the angular differentiation of images, for which it is necessary, in addition to eliminating the diffusion surface, to design the reproduction of images in a manner different than that used in the previous systems.

In a system based on the angular differentiation of images, from each point of observation a rectangle is seen of each image, which rectangle will differ for each point of observation. The group of rectangles corresponding to one observation point will form a single image different from that corresponding to any other point.

In the angular differentiation of images no diffusion surfaces on which the different images are focussed is employed. An imaginary plane exists on which the images are focussed, but this plane does not exist physically.

For pedagogical reasons, said plane can be thought of as a transparent surface.

In order to follow the same order of exposition as that used in the examination of the previous processes, we will begin by defining the fundamental characteristic of any transparent surface:

"Any point on the transparent surface is transformed into a center which emits photons which retain the same direction as the incident photon."

Consequently:

Any viewer, whatever his position, will see a single point of the projected image. This point is the intersection with the transparent surface of the line which joins the optical center of the projector objective to the optical center of the viewer. For each position of observation there will correspond a separate image or point.

If two or more images are projected at the same time from different positions in space onto the transparent surface, the photons coming from the different projections will retain their direction after passing through it. The different images can be distinguished because the photons of each emerge from this transparent surface at a different angle; that is to say *"Angular Image Differentiation"* can be used.

In order briefly to describe the invention which is the object of this application, an optical sheet of vertical cylinders will first of all be placed in front of this transparent surface at a distance away equal to the focal length of these cylindrical lenses.

The focal length of the cylindrical lenses is chosen in such a way that the ratio of the transverse size of the cylinder to its focal length is at least equal to the ratio between the distance between two contiguous projection objectives and the projection distance, and never greater than twice this value.

After positioning the vertical cylinders with the above characteristics, any viewer, whatever his position, will see as many image segments as there are projection objectives. These segments will line up in a single linear segment. This linear image segment will be different for each point of observation and will be contained in the line resulting from the intersection of the plane which contains the projection objectives and the observer with the transparent projection surface.

If the system merely attempts to reproduce the horizontal parallax, the projection objectives will be located on a horizontal line and a second optical screen of horizontal cylinders, the focal lines of which are in the same focal plane of the vertical cylinders and therefore coincide with the transparent screen imagined for instruction purposes, will take care of converting the above segment into a rectangle the base of which will be of the size of this same segment and the height of which will be that of the transparent surface. To each point of observation there will correspond a different image rectangle and the group of these rectangles will form a single and different image at each point of observation.

The focal length of these horizontal cylinders must be as small as possible as compared with their width (semicircular cylinders) in order that their aperture permits the viewing, from any point, of a rectangle which is as high as the optical system itself.

If the system is integral, that is to say, if it is desired to reproduce vertical parallax in addition to horizontal parallax, the above horizontal cylinders must be designed in a manner similar to that described for the vertical cylinders. In this case, the fact must be taken into account that the projection objectives which previously formed a line now form a rectangle.

Summarizing, the optical system which is the object of this invention consists of two sheets of cylindrical lenses which are perpendicular to each other and such that the resultant vertical optical aperture covers at least two vertical projection objectives and at most three and the resultant horizontal optical aperture covers at least two horizontal projection objectives and at most three.

The system thus designed is formed of cylinders of very small aperture, that is to say, of a very large radius as compared with its transverse size. This small aperture value is furthermore independent of the orthoscopic viewing angle. In this way, cylinders of easy and inexpensive manufacture can produce orthoscopic viewing angles which are as large as desired. The size of the cylinders, there being concerned a system based on image angular differentiation, is independent of the number of images reproduced and therefore the quality of the reproduction can be very high. If an additional convergent optical system is not used, images of large size can be reproduced without difficulty. Front projection is achieved by merely replacing one of the sheets of lenses by mirrors, without the specular image of the projectors being apparent at any time. Rear projection does not require special adjustments of precision and each observer sees a different image with each eye.

Finally, the advantages of this system as compared with all other systems are:

(A) The orthoscopic viewing angle can be made as large as desired, it depending only on the number of projectors, the distance between them, and the projection distance.

(B) The size or width of the cylinders is not limited by the number of images and can be designed as small as desired, so that the quality of the image is only limited by the conditions of manufacture of these cylinders.

(C) When the viewer leaves the field of vision, no pseudoscopy takes place.

(D) It is not necessary to create a complex means for dividing the projected images into ordered and interlaced vertical stripes, nor is there required the collaboration of other convergent optical systems in addition to the lenticular plane, the rear projection requires no adjustments in precision and, finally, the system of the invention is easier to manufacture and simpler to implement whatever the size of the image reproduced.

(E) The images perceived by each eye of the viewer are different, regardless of his location.

(F) The integral reproduction systems are easy to manufacture.

(G) Front projection is achieved very easily by replacing one of the sheets of lenses by another sheet of mirrors.

It should be pointed out that this system is only valid for projection and cannot be used in photographic reproductions on paper. On the other hand, it is possible, with this system, to design three-dimensional slide viewers.

BRIEF DESCRIPTION OF THE DRAWING

In these figures:

FIG. 1 shows the horizontal parallax angle E with which an object P is seen at a distance 1 from a viewer with a distance b between his eyes.

FIG. 2 shows diagrammatically a viewer $O_1$ looking at an object P through the window AB.

FIG. 3 shows diagrammatically m viewers $O_1, O_2 \ldots O_m$ looking at an object P through the window AB.

DETAILED DESCRIPTION OF THE PREFERRED EMBODIMENTS

Figure 1:
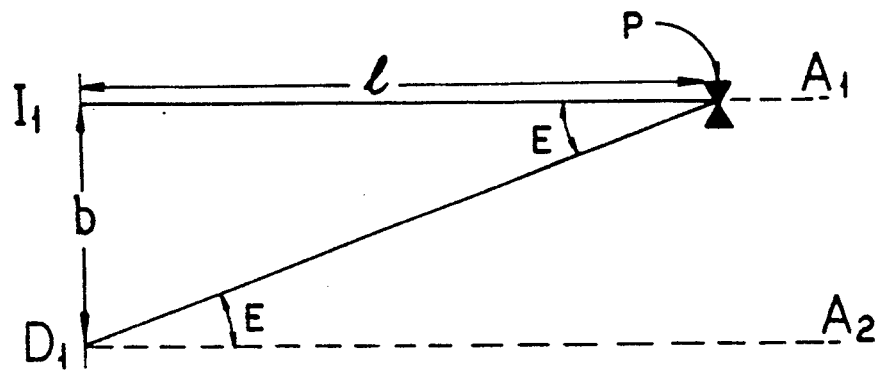
FIGS. 1, 2 and 3 explain the ideas on which the new system is based, while FIGS. 4, 5 and 6 describe the system which is the object of this invention.

Binocular vision is vision which makes it possible to appreciate the distance away of objects. This function is obtained by means of the angle through which the eyes turn. Let lines I1A1 and D1A2 be the lines of vision to infinity of the left eye I1 and the right eye D1 respectively. See FIG. 1 which diagrammatically shows the binocular observation of an object P.

If the eyes turn to look at an object P situated at a distance 1 on the straight line I1A1, the right eye will do so in an angular quantity E given by the equation $$\tan E = \frac{b}{1}$$

in which b is the distance between the eyes of the observer.

The angle E is called the angle of horizontal parallax. As the eyes are normally on a horizontal line, systems which reproduce this parallax are sufficient and satisfactory. For this reason, the taking and reproduction of horizontal parallax constitute the essential part of three-dimensional viewing based on image angular differentiation, as will be explained below.

Assume a viewer "$O_1$" looking at an object P through a window of width AB present in a wall perpendicular to the lines of vision to infinity.

Figure 2:
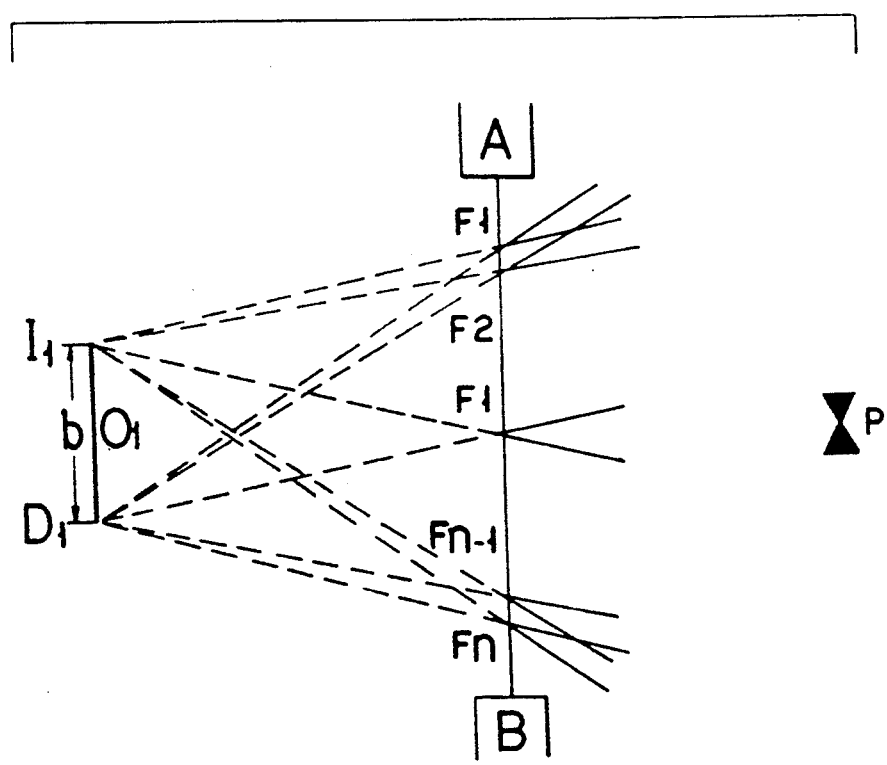

FIG. 2 shows the optical diagram of a viewer $O_1$ looking at an object P through the window AB.

This FIG. 2 shows this viewer $O_1$ in plane view, with his right eye $D_1$ and his left eye $I_1$. The bundle of light rays which, coming from the landscape, pass through $I_1$ (homocentric on $I_1$) is the one which serves to form the image of the left eye. Similarly, the bundle of light rays which pass through $D_1$ (homocentric on $D_1$) serves to form the image of the right eye.

The perception of three-dimensions is achieved when the brain synthesizes the images from the left and right eyes formed by these two bundles of light rays, which pass through the non-coinciding points $I_1$ and $D_1$.

The straight line AB contained in the trace of the plane containing the window is considered to be broken up into the series of infinitely close points $F_1, F_2 \ldots F_i \ldots F_{n-1}, F_n$.

It is important to note that every ray belonging to the homocentric beam $I_1$, as well as every ray belonging to the homocentric beam $D_1$, is contained in the group of homocentric beams $F_1, F_2 \ldots F_i \ldots F_{n-1}, F_n$, provided that the distance $F_i - F_{i-1}$ for any i is sufficiently small.

Figure 3:
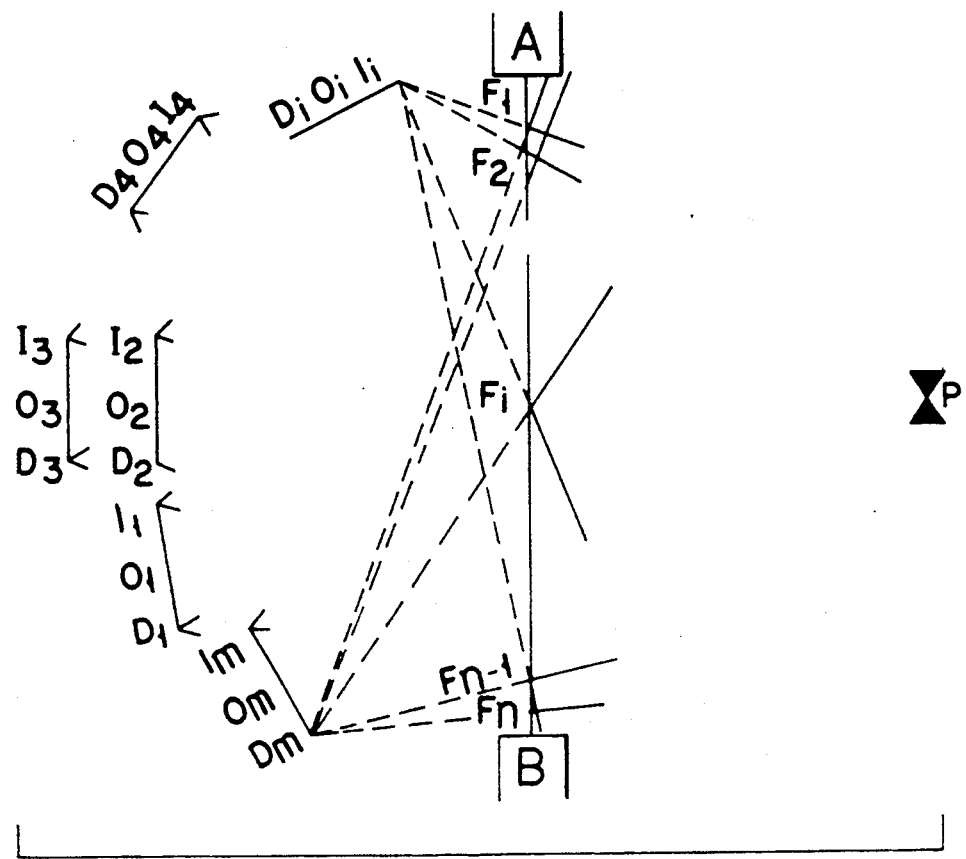

If several viewers $O_1, O_2 \ldots O_m$ looking at the same object through the front window AB and situated at different points are considered, since it is not necessary to consider the vertical parallax, all the pairs of eyes can be represented by their projection on a common horizontal plane. FIG. 3 shows the optical diagram of m observers looking at an object through the window AB.

It is clear that, for obvious topological reasons, every homocentric beam $I_j$ or $D_j$ is contained in the series of homocentric beams $F_1, F_2 \ldots F_i \ldots F_{n-1}, F_n$, provided that the distance $F_i - F_{i-1}$ is sufficiently small.

Stated differently:

"The image formed, taking as basis the homocentric beams $I_j$ or $D_j$ which correspond to the left and right eyes of the viewer $O_j$, and for any viewer $O_j$, can be synthesized by suitably selecting and composing sections of the images formed, taking as basis the homocentric beams $F_1, F_2 \ldots F_i \ldots F_{n-1}, F_n$, provided that the distance $F_i - F_{i-1}$ is sufficiently small".

The demonstration continues to be valid whatever the curve may be which contains the homocentric beams $F_1, F_2 \ldots F_i \ldots F_n$, as long as it is continuous and passes through points A and B.

The analogy between the idea on which the development of cinematography is based is obvious, namely one image after the other, separated by a sufficiently small period of time, and the basic idea which has just been set forth for the creation of a three-dimensional system, namely one image Fi separated from the other $F_{i+1}$ by a sufficiently small distance.

There is also an analogy in the difference between the frequency of reproduction, 48 images per second, as from which a human being does not perceive interruptions in light and the frequency of the taking of the pictures, 16 images per second, which is the minimum necessary to obtain continuity in movement and the number of images necessary for the reproduction and that necessary for the taking of the images in the three-dimensional system.

The minimum separation necessary (or size of the reproduction elements) in order not to see that the image is formed of bands, and the necessary separation (or distance between optical centers of objectives on the taking of the images) in order to be able to reproduce the variation of parallax in apparently continuous form are very different.

Experience shows that the number of reproduction elements required for proper reproduction is much greater than that necessary for three-dimensional taking of images.

The process which is the object of the present invention, like shuttering in cinematography, makes it possible, with a small number of images taken, to reproduce with a large number of elements. In cinematography, the same image is repeated for several shutterings. In three-dimensional reproduction, the same image will be repeated in various reproduction elements.

In this way, from each point of observation the same image will be seen through a large number of vertical reproduction elements. These reproduction elements, which are adjacent to each other, will form a rectangle. This rectangle will be different for each point of observation. The group of rectangles corresponding to all the images will form a single and separate image for each position of viewing.

The proper viewing conditions impose practical limits on the distance between the optical centers of the contiguous objectives of the cameras upon photography and the distance between the optical centers of the adjacent objectives of the projectors upon reproduction.

The maximum distance between the optical centers of the objectives of the cameras is imposed, for each depth of field, by the condition of continuity of the image upon the reproduction. This condition is the same for all three-dimensional reproduction systems of the prior art and that of the present invention.

The distance between the adjacent optical centers of the projectors when image angular differentiation is used is determined by the ratio between the projection aperture and the viewing aperture.

The projection aperture is the ratio between the distance between the optical centers of two adjacent projector objectives and the projection distance.

The viewing aperture is the ratio between the distance between the eyes of a viewer and the viewing distance.

Our experience has shown that three-dimensional viewing with image angular differentiation is acceptable even for projection aperture values three or four times greater than the viewing values.

As has just been shown, the most obvious form of recording the horizontal parallax is to have as many recording objectives as points i. Nevertheless, experience shows that this number of recorded images can be much smaller than the number of points i.

In other words, the distance between objectives upon the recording can be much greater than the distance $F_i - F_{i-1}$ used in the prior description.

Thus, the method of recording will consist of a series of recording objectives the optical centers of which are located on a horizontal line separated from each other by a distance Kc which will be a function of the recording depth of field.

Figure 4:
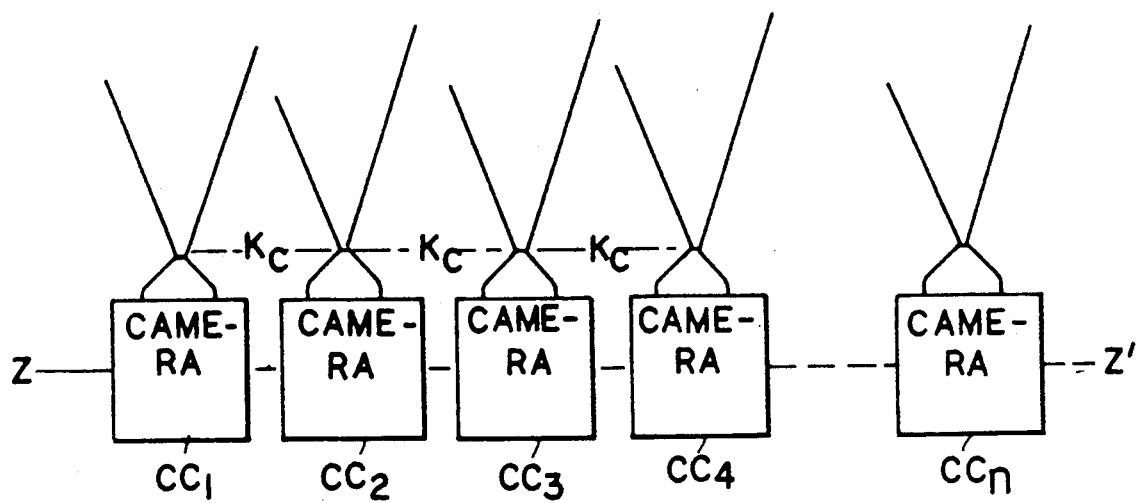
FIG. 4 shows n cameras $CC_1, CC_2 \ldots CC_n$ separated from each other by distance Kc, with their optical axes parallel.

FIG. 4 shows this procedure diagrammatically. For simplicity in the drawing it has been assumed that each objective belongs to a separate camera and that the optical axes of these objectives are parallel to each other. In general, several or all of the objectives can belong to a single camera and the optical axes can be inclined.

In FIG. 4, $CC_1$, $CC_2$, $CC_3$ ... $CC_n$ are the n chambers with the optical centers of the objectives separated by a distance Kc and located on the horizontal line ZZ'.

Upon projection, the same number of projection objectives is used as the number of camera objectives which were used upon the taking of the image. Each of them will project an image onto a transparent optico-cylindrical screen.

Figure 5:
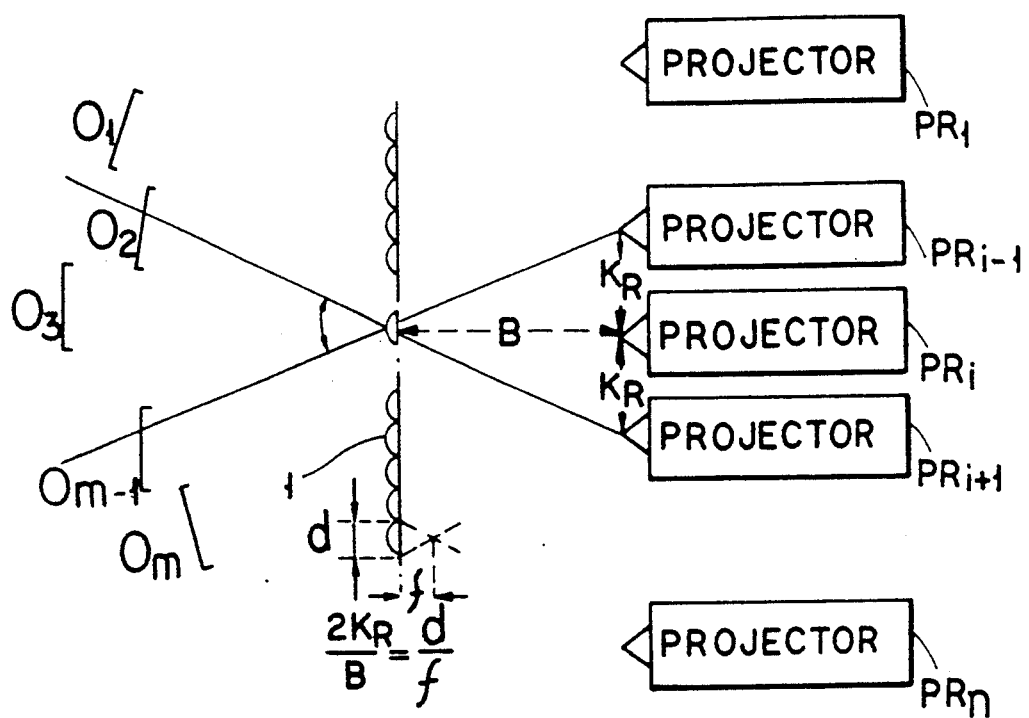
FIG. 5 shows the arrangement of the projectors $PR_1, PR_2 \ldots PR_n$ and of the optical screen of vertical cylinders (1) of focal length f and transverse size d. The distance between two adjacent projectors is $K_R$ and the projection distance is B.

FIG. 5 shows diagrammatically the arrangement of the projectors $PR_1$, $PR_2$ ... $PR_n$ separated from each other by the distance KR projecting on the optico-cylindrical reproduction screen.

In this figure, for the sake of simplicity, each objective has been shown as belonging to a single projection objective and to all the parallel optical axes. Actually, some or all the objectives may belong to a single projection objective and the optical axes may be inclined.

It is important to bear in mind that the angle formed by the different films of images upon projection must be the same as that formed by the films of images upon the recording. Otherwise, the plane surfaces of equal parallax upon the recording will be reproduced as curved surfaces upon reproduction, unless a compensatory inclination is introduced into the process of printing the films.

The distance B from the projectors to the screen is imposed by the focal length of the projection objective and the size of the optico-cylindrical screen.

The optico-cylindrical screen (1) is formed of cylinders of a width d, which is sufficiently small not to be perceived, experience showing that for a healthy eye the width d of the cylinder must be smaller than the viewing distance in meters divided by 3,500. The focal length f is given by:

$$f = B \frac{d}{2K_R}$$

deduced by equating the aperture of each cylinder $G = d/f$ with that, $(2K_R/B)$, under which three projection objectives are seen. Actually, the aperture of the cylinder can be included between this value, vision covering three projection objectives, and half thereof, vision covering two projection objectives. In this way, an imperceptible transition from one image band to the next is achieved since the part of the image from projector i is smoothly mixed with that projected by its neighbors $i-1$ and $i+1$.

If the projectors are separated from each other, the parallax reproduction decreases although the three-dimensional viewing angle increases, and vice versa.

For a given number of projection objectives, to each variation of distance between them, if the same projection distance is maintained, there corresponds a different cylindrical screen, since the relationship between transverse size and focal length of the cylinder must be made equal to the ratio between distance between projection objectives and projection distance.

If one only had available the optical screen of vertical cylinders (1) described above, the view of the images would be limited to a linear segment composed of as many subsegments as there are images or projection objectives. This linear segment is given by the intersection of the plane which passes through the projection objectives and the viewing point with the plane which contains the above-mentioned transparent optical sheet of vertical cylinders.

In order for the vertical planes to be formed adequately, another optical sheet of horizontal cylinders is used, of sufficient aperture so that any viewer, regardless of his height, is able to see the entire vertical component of the image. In general, semi-circular cylinders can be chosen, since they have the maximum aperture, with a transverse size which, as in the vertical case, must be small enough to be imperceptible.

Figure 6:
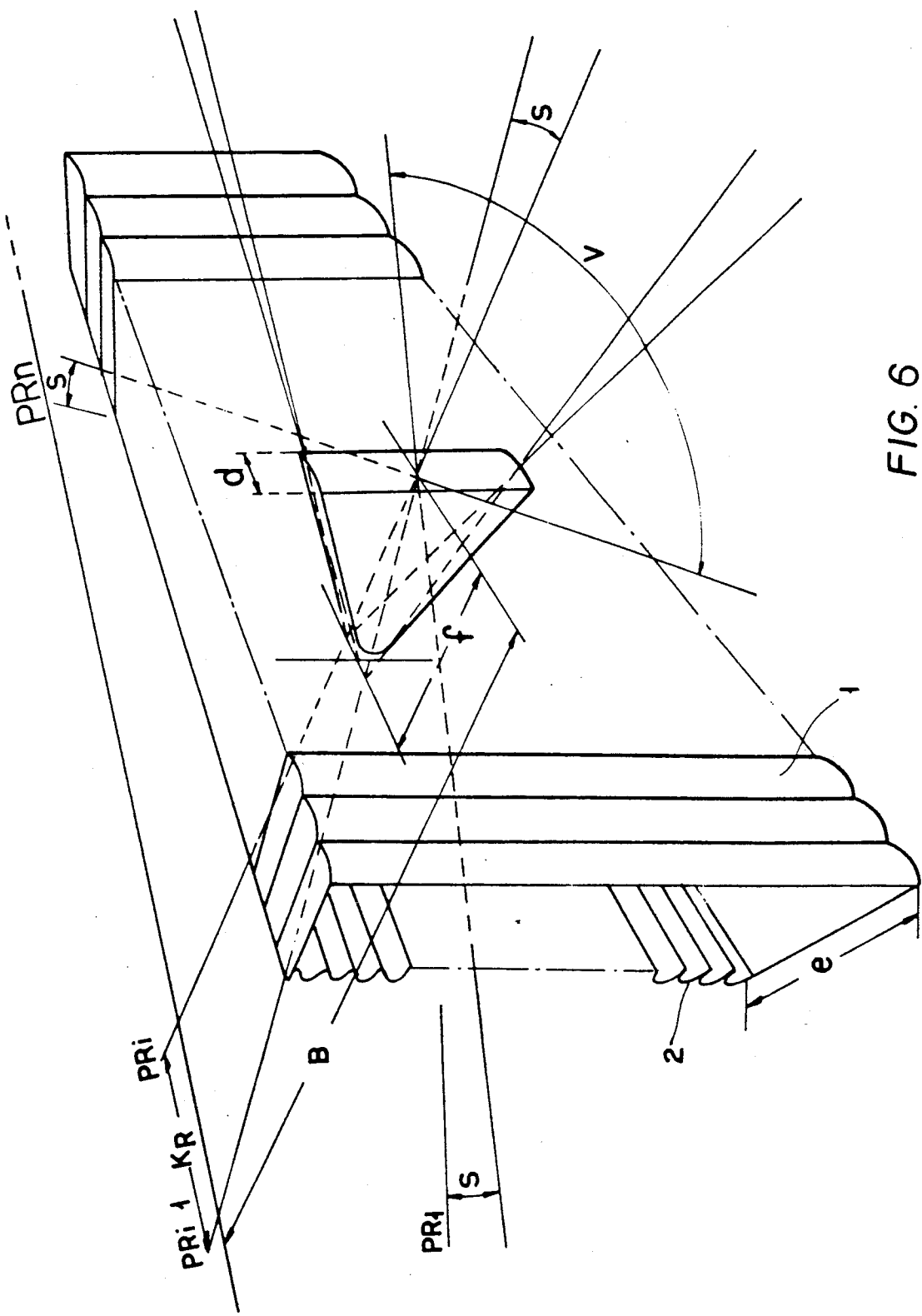
FIG. 6 shows the optical system which is the object of this invention, from which there can be noted, in its front part, the optical screen of vertical cylinders (1) and in its rear part the optical screen of horizontal cylinders (2); "e" is the thickness of the system; V is the viewing angle; S is the horizontal angle at which two projectors are seen; f is the focal length of the vertical cylinders; B is the projection distance; $K_R$ is the distance between two adjacent projectors; and $PR_1, PR_2 \ldots PR_n$ is the location of the optical centers of the projectors.

Thus, the optical reproduction system will remain as shown in FIG. 6 and it will be viewed by transparency. In this FIG. 6, there can be noted the viewing angle V, which is a function of the ratio between the distance of separation between the first projector and the last projector and the projection distance B.

The aperture angle S of the vertical cylinders can be considered in the same manner, it being a function of the ratio between the separation between two adjacent projection objectives $K_R$ and the projection distance B, which ratio is the same as that obtained between the transverse size of the vertical cylinder d and its focal length f.

In this figure, the viewing of the vertical component through the optical sheet of horizontal cylinders can also be noted.

In order that the focal lines of the horizontal and vertical cylinders coincide in the same plane, the thickness of the optical system must have the value:

$$e = \frac{n}{n-1}(r_2 - r_1)$$

which $r_2$ and $r_1$ are the radii of the vertical and horizontal cylinders respectively and n is the index of refraction of the substance of which the optical system is made.

As further embodiment, the same bases as have served to create a three-dimensional reproduction system with variation of the horizontal parallax are valid for the design of an "*integral reproduction system*" which reproduces the horizontal and vertical parallax simultaneously.

In this case the projection objectives will be arranged on a rectangle.

For the design of the vertical cylinders (1) the same developments as set forth above apply.

The horizontal cylinders (2) are designed in a manner similar to the design of the vertical cylinders. The ratio of the transverse size of the cylinder to its focal length is at least equal to the ratio between the distance between three vertical projection objectives and the projection distance.

For the focal length of the horizontal cylinders there must be satisfied the equation:

$$f_H = \frac{d_H \cdot B}{2K_{RV}}$$

which
  $d_H$=the transverse size of the horizontal cylinder
  B=the projection distance
  $K_{RV}$=the distance between adjacent vertical projection objectives.

For the thickness e, the formula given above in connection with the horizontal parallax reproduction system remains valid.

The above mathematical restrictions only condition the transverse dimensions and the apertures of the optical elements.

The rest of the optical characteristics, such as whether lenses or mirrors, optically convergent or divergent, can be selected arbitrarily.

I claim:

1. An optical system, for the reproduction of three-dimensional images with vertical and horizontal parallax on which N images are projected, having projector objectives forming a rectangle, taken from N different places, also forming a rectangle, formed of two sheets of cylindrical lenses which are perpendicular to each other, characterized by the fact that the vertical optical aperture has a value greater than the quotient obtained by dividing the distance between two contiguous vertical projection objectives by the projection distance and less than twice said value, and the horizontal optical aperture has a value greater than the quotient obtained by dividing the distance between two contiguous horizontal projection objectives by the projection distance and less than twice said value.

2. An optical system for the three-dimensional reproduction of images with horizontal parallax on which N images are projected, having horizontally aligned projector objectives, taken from N different places also forming a horizontal line, formed of two sheets of cylindrical lenses which are perpendicular to each other, characterized by the fact that the vertical optical aperture is at least sufficient to permit seeing the image in its entire height from any contemplated point of observation, and the horizontal aperture has a value at least equal to the quotient obtained by dividing the distance between two contiguous projection objectives by the projection distance and less than twice said value.

3. An optical system according to claim 1, characterized by the fact that the two sheets of cylindrical lenses are optically convergent.

4. An optical system according to claim 1, characterized by the fact that the two sheets of cylindrical lenses are optically divergent.

5. An optical system according to claim 1, characterized by the fact that one of the sheets of cylindrical lenses is optically convergent and the other is optically divergent.

6. An optical system according to claim 3, characterized by the fact that one of the sheets has cylindrical lenses and the other of the sheets has cylindrical mirrors.

7. An optical system according to claim 3, characterized by the fact that the two sheets of cylindrical lenses face towards or away from the projectors or else one faces them and the other faces away from them.

* * * * *

UNITED STATES PATENT AND TRADEMARK OFFICE
CERTIFICATE OF CORRECTION

PATENT NO.  :   5,013,147
DATED       :   May 7, 1991
INVENTOR(S) :   Juan DOMINGUEZ MONTES It is certified that error appears in the above-identified patent and that said Letters Patent is hereby corrected as shown below:

Title page, [Item 76,] "D." should be

-- Dominguez --.

Signed and Sealed this

Twenty-ninth Day of December, 1992

Attest:

DOUGLAS B. COMER

*Attesting Officer*     Acting Commissioner of Patents and Trademarks